(12) United States Patent
Dettloff et al.

(10) Patent No.: US 8,980,979 B2
(45) Date of Patent: Mar. 17, 2015

(54) CURABLE COMPOSITIONS CONTAINING CYCLIC DIAMINE AND CURED PRODUCTS THEREFROM

(75) Inventors: Marvin L. Dettloff, Lake Jackson, TX (US); James R. Lowrey, Houston, TX (US); Hemant A. Naik, Twinsburg, OH (US); Maurice J. Marks, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 161 days.

(21) Appl. No.: 13/254,180

(22) PCT Filed: Feb. 16, 2010

(86) PCT No.: PCT/US2010/024286
§ 371 (c)(1),
(2), (4) Date: Sep. 1, 2011

(87) PCT Pub. No.: WO2010/107539
PCT Pub. Date: Sep. 23, 2010

(65) Prior Publication Data
US 2012/0010330 A1    Jan. 12, 2012

Related U.S. Application Data

(60) Provisional application No. 61/160,901, filed on Mar. 17, 2009.

(51) Int. Cl.
*C08G 59/56*    (2006.01)
*C08G 59/62*    (2006.01)
*C08L 63/00*    (2006.01)

(52) U.S. Cl.
CPC .............. *C08G 59/56* (2013.01); *C08G 59/621* (2013.01); *C08L 63/00* (2013.01)
USPC ........... 523/400; 528/110; 528/120; 528/121; 528/122; 525/523

(58) Field of Classification Search
CPC ....... C08L 63/00; C08G 59/56; C08G 59/621
USPC ............. 523/400, 466; 525/109, 523; 528/86, 528/87, 88
See application file for complete search history.

(56) References Cited

U.S. PATENT DOCUMENTS

| | | | |
|---|---|---|---|
| 3,740,373 A | 6/1973 | Bentley et al. | |
| 3,853,812 A * | 12/1974 | Helm | 528/120 |
| 3,875,072 A | 4/1975 | Waddill | |
| 3,943,104 A | 3/1976 | Waddill | |
| 4,128,525 A * | 12/1978 | Yeakey et al. | 524/602 |
| 4,189,564 A * | 2/1980 | Waddill | 528/94 |
| 4,800,222 A | 1/1989 | Waddill | |
| 4,828,879 A | 5/1989 | Sellstrom et al. | |
| 4,835,241 A | 5/1989 | Waddill | |
| 4,904,711 A | 2/1990 | Sellstrom et al. | |
| 5,169,473 A | 12/1992 | Bertrram et al. | |
| 5,948,881 A * | 9/1999 | Shah et al. | 528/339.3 |
| 6,008,313 A * | 12/1999 | Walker et al. | 528/123 |
| 6,136,944 A * | 10/2000 | Stewart et al. | 528/120 |
| 6,946,503 B2 | 9/2005 | Burton et al. | |
| 2003/0195324 A1 | 10/2003 | Burton et al. | |

FOREIGN PATENT DOCUMENTS

| | | |
|---|---|---|
| CA | 2042858 | 11/1991 |
| EP | 0297696 | 1/1989 |
| EP | 0388544 | 9/1990 |
| GB | 2032436 | 5/1980 |
| JP | 64-006063 | 1/1989 |
| JP | 02-274722 | 11/1990 |
| JP | 04-227924 | 8/1992 |
| WO | 2008/103868 | 8/2008 |

OTHER PUBLICATIONS

Huntsman, "Technical Bullentin: Amine Applications and Properties Data," copyright 2008, p. 7.*
International Preliminary Report on Patentability from related PCT application PCT/US2010024286, dated Jun. 24, 2011, 8 pages
AASHTO Designation M 237-96, (2005), "Standard Specification for Epoxy Resin Adhesives for Bonding Traffic Markers to Hardened Portland Cement and Asphalt Concrete", American Association of State and Highway Transportation Officials, 2007, 8 pages.
International Search Report & Written Opinion from related PCT application PCT/US2010/024286 dated Jun. 16, 2010, 9 pages.
Office Action (translation) for related Japanese Application No. 2012-500808, dated Jun. 18, 2013, 3 pgs.

* cited by examiner

*Primary Examiner* — Randy Gulakowski
*Assistant Examiner* — Ha Nguyen
(74) *Attorney, Agent, or Firm* — Brooks, Cameron & Huebsch, PLLC

(57) ABSTRACT

A curable composition including (a) at least one cyclic diamine, (b) at least one non-heterocyclic amine that has a pKa value of approximately 9.5 to about 12 at 25° C. for the most basic amine group in the non-heterocyclic amine molecule, (c) at least one epoxy resin, and (d) at least one alkylated phenol; (i) wherein the equivalents of the amine hydrogens from the cyclic diamine compared to the total amine hydrogens from both the cyclic diamine and the non-heterocyclic amine in the composition are greater than about 5%; (ii) wherein the ratio of the equivalents of the total amine hydrogens in the composition to the equivalents of the total epoxies in the composition is greater than or equal to about 1; and (iii) wherein the alkylated phenol is in an amount greater than about 10 wt % of the curable composition.

12 Claims, No Drawings

CURABLE COMPOSITIONS CONTAINING CYCLIC DIAMINE AND CURED PRODUCTS THEREFROM

This application is a National Stage application under 35 U.S.C. 371 of PCT/US2010/024286, filed on Feb. 16, 2010 and published as WO 2010/107539 A1 on Sep. 23, 2010, which claims the benefit of U.S. Provisional Application Ser. No. 61/160,901 filed Mar. 17, 2009, the entire contents of which are incorporated herein by reference.

BACKGROUND OF THE INVENTION

1. Field of the Invention

The present invention relates to a curable composition comprising the use of a cyclic diamine in fast-curing epoxy formulations.

2. Description of Background and Related Art

N-aminoethylpiperazine (AEP) is a compound that is known to be used as an "accelerator" for assisting the cure of epoxy/amine-based formulations. Much has been made of the unique attributes of AEP such as the fact that AEP contains primary, secondary and tertiary amine groups that allow AEP to help rapidly cure epoxy/amine-based formulations. Other substituted piperazine molecules have been evaluated as a substitute for AEP for epoxy/amine-based formulations, but none of the known piperazine molecules have offered the same accelerating effects as AEP.

In column 1, lines 35-37 of U.S. Pat. No. 6,946,503 (the '503 patent), it states: "Shortages of AEP have created a need for a substitute material that can serve to accelerate the curing reaction of slower amine curatives (e.g., JEFFAMINE® brand amines)." Column 1, lines 61-63 of the '503 patent further states: "[AEP] has provided some of the highest exotherm temperatures seen when used to cure epoxy resins." The '503 patent, and others references listed herein, have tried to duplicate this degree of reactivity by replacing AEP with various alternative compositions, particularly when the principal curing agent is a JEFFAMINE-type (polyoxyalkylene polyamine) curing agent. However, end use applications dictate the type of curing agent and the degree of acceleration that is needed for a curable epoxy resin formulation to exhibit the desired properties in the time frame required by the end use application. Although known polyoxyalkylene polyamines are frequently used in many applications, the polyoxyalkylene polyamines are by no means the only amine curing agents that need to be accelerated. There are various known methods to accomplish these ends. However, for known AEP-based epoxy formulations, no single substitute has been found that is universally acceptable in all the applications where AEP is used because of its reactivity. Therefore, work continues to find suitable replacements for AEP in different applications.

It would be desirable to provide a substitute for AEP for certain end use applications such as civil engineering applications. Civil engineering applications, such as road traffic markers applications which use an epoxy/amine resin formulation, are applications that require fast cure of the resin formulation so that traffic can resume driving over the roads in a relatively short period of time. One example of such a formulation is disclosed in AASHTO Designation M 237-96 entitled "Epoxy Resin Adhesives for Bonding Traffic Markers to Hardened Portland Cement and Asphalt Concrete." The resin adhesive is designated as "Type IV Epoxy" and uses AEP as the sole amine curing agent. Other related applications which might use this type of resin formulation include pavement markings and bridge deck overlays.

U.S. Pat. No. 3,875,072 (the '072 patent) discloses a piperazine and alkanolamine accelerator for epoxy curing. The '072 patent deals with curing epoxy resins with a JEFFAMINE-type curing agent using a synergistic accelerator mixture consisting of piperazine and an alkanolamine. The '072 patent states that it is essential that the weight ratio of piperazine to alkanolamine be in the range of 1:8 to 1:1. The '072 patent also teaches that preferably the combined amount of N—H from the JEFFAMINE, piperazine and alkanolamine will provide up to a 10% excess of the stoichiometric amount needed to cure the epoxy. The '072 patent also teaches that the mixture containing the epoxy, polyoxyalkylene polyamine, piperazine and alkanolamine can be allowed to self-cure at ambient room temperatures of between about 0° C. to about 45° C. The '072 patent also discloses that the mixture can be cured or post-cured at elevated temperatures of up to about 175° C., if desirable or convenient. The '072 patent covers a composition. The end-use applications cited in the '072 patent are protective coatings, adhesives, seamless and terrazzo flooring, castings, laminates, and in grouting, potting, encapsulating, caulking and sealing compositions. The '072 patent does not disclose that non-heterocyclic amines with pKa values greater than 9.5 to about 12 can lead to significantly enhanced reactivity when combined with the cyclic diamines.

U.S. Pat. No. 3,943,104 (the '104 patent) discloses a method of accelerating epoxy curing. The teachings in '104 patent are essentially the same as in U.S. Pat. No. 3,875,072 described above, except that the '104 patent covers a process of using an accelerator mixture.

U.S. Pat. No. 4,189,564 (the '564 patent) discloses a non-crystallizing epoxy resin accelerator. The '564 patent states, in column 1, lines 53-57, that "U.S. Pat. Nos. 3,875,072 and 3,943,104 disclose an accelerator comprising piperazine and an alkanolamine. This accelerator combination has one disadvantage. It tends to crystallize at low temperature, thus reducing its usefulness in some cases." In column 4, lines 15-20, of the '564 patent further states that "An improvement in crystallizing tendency over the above will take place once any amount of N-aminoethylpiperazine is present with a piperazine, alkanolamine mixture. Therefore, my invention includes mixtures of piperazine, N-aminoethylpiperazine (AEP) and an alkanolamine where AEP is present." The '564 patent teaches both a composition and a process. The use of AEP to help suppress crystallization precludes this from being an AEP-free composition of matter.

U.S. Pat. No. 4,800,222 (the '222 patent) discloses an accelerator for use with curing agents and resins including piperazine, triethanolamine and tris(dimethylaminomethyl) phenol. The '222 patent covers a composition "comprising an epoxy resin and an accelerator comprising 50-60 parts by weight treithanolamine, 20-30 parts by weight tris(dimethylaminomethyl)phenol and the balance piperazine." In all of the '222 patent's working examples a large amount of a JEFFAMINE product is used as the curing agent. The '222 patent does not disclose that non-heterocyclic amines with pKa values greater than 9.5 to about 12 can lead to significantly enhanced reactivity when combined with the cyclic diamines.

U.S. Pat. No. 4,828,879 (the '879 patent) discloses a polymer concrete composition for cementitious road repair and overlay. The abstract of the '879 patent states: "A polymer concrete system has been discovered which is useful in road overlay and repair. The binder for this aggregate-filled system consists of a liquid epoxy resin and triethyleneglycol diamine or tetraethylene glycol diamine curing agent. A piperazine accelerator ensures adequate strength development after short cure times at ambient temperatures. The binder-aggregate system is relatively flexible, has excellent compression and flexural strength and adheres well to the substrate. The system of the '879 patent is distinguished by its fast cure to a compression strength of 3000 psi which will support automotive traffic." In column 2, lines 54-65 of the '879 patent, it states: "The binder formulation of this invention is a low viscosity system which cures rapidly. High filler loadings are possible and compression and flexural strength develop quickly even at lower temperatures, e.g. 40° F. The coefficient of thermal expansion of a polymer concrete containing this binder system closely resembles that of Portland cement concrete up to about 120° F. Polymer concrete overlays containing this binder system resist delamination from a Portland cement concrete substrate during freeze-thaw cycling. Nonylphenol may be used in this application because it improves flexibility." The accelerator used in the examples of the '879 patent is known as "Accelerator 399" and is a mixture of 10-20% piperazine and 5-10% N-aminoethylpiperazine in triethanolamine. This accelerator is also described in U.S. Pat. No. 4,189,564. The '879 patent covers both a method and a binder composition. The '879 patent does not disclose that non-heterocyclic amines with pKa values greater than 9.5 to about 12 can lead to significantly enhanced reactivity when combined with the cyclic diamines.

U.S. Pat. No. 4,835,241 (the '241 patent) discloses an epoxy coating using an acrylate ester, a polyetherpolyamine and a piperazine(s). According to the abstract of the '241 patent an epoxy resin composition is used as a coating composition. The composition consists of a mixture of a bisphenol A-based epoxy resin and an acrylate ester that is reacted with a mixture of a Jeffamine-type polyoxyalkylene polyamine and piperazine. In column 2, lines 41-42, the '241 patent states: "The curative additionally comprises a piperazine accelerator in molar equivalence with the acrylate ester." In column 9, lines 38-39 of the '241 patent, it states: "The reactive amines with the best overall properties were piperazine and AEP." In column 5, lines 49-52 and column 6, lines 1-8, the '241 patent states: "The piperazine compound is incorporated in an amount which will ensure a maximum level of primary amine reaction but give a reaction product which is not too viscous to handle. The greater the ratio of accelerator to acrylate ester, the less primary amine is reacted. However, a large excess of epoxy resin will result in a very viscous product or even a gel which is undesirable. However, excess piperazine compound is undesirable because of extraneous reactions. Accordingly, the instant coatings are formulated with piperazine compound in an approximate equivalence with the acrylate ester." The acrylate ester used in the examples of the '241 patent is TMPTA (trimethylolpropane triacrylate). The '241 patent does not disclose the use of alkylated phenolic compounds in combination with certain proportions of the selected cyclic diamines disclosed in this document for enhancing reactivity. The '241 patent also does not disclose that non-heterocyclic amines with pKa values greater than 9.5 to about 12 can lead to significantly enhanced reactivity when combined with the cyclic diamines.

U.S. Pat. No. 4,904,711 (the '711 patent) discloses a polymer concrete composition for cementitious road repair and overlay. The teachings in the '711 patent are essentially the same as in U.S. Pat. No. 4,828,879, except that the '711 patent discloses a composition that combines both a binder and an aggregate.

U.S. Pat. No. 6,946,503 (the '503 patent) discloses an amine blend accelerator for a polyoxyalkylenepolyamine-cured epoxy resin. The abstract of the '503 patent states: "Provided herein are amine blends which may be used in place of N-aminoethylpiperazine as accelerator in the curing reaction of epoxy resins." The key blend of the '503 patent is a mixture of 4-(3-aminopropyl)morpholine (APM) and 2-2 (aminoethylamino)ethanol (AEEA). The '503 patent discloses a process for producing a cured epoxy polymer with a Jeffamine-type curing agent and an accelerator mixture consisting of APM and AEEA. The '503 patent does not provide any data indicating that the blend composition acts similarly to AEP either in terms of reactivity or properties. In addition, the '503 patent does not disclose the use of alkylated phenolic compounds in combination with certain proportions of the selected cyclic diamines disclosed in this document for enhancing reactivity.

WO 2008/103868 discloses an accelerator for the polymerization of an epoxy resin. The detailed description in WO 2008/103868 states: "[0014] Embodiments of the present invention disclose an accelerator composition have at least one amine and a glycerin. The at least one amine may comprise AEP. However, a wide variety of other amines can be used in the accelerator compositions of this invention. Combinations of two or more amines can be used." WO 2008/103868 also teaches the use of glycerin. WO 2008/103868 does not disclose the use of alkylated phenolic compounds in combination with certain proportions of the selected cyclic diamines disclosed below for enhancing reactivity.

Accordingly, there is still a need in the industry to develop a suitable replacement for AEP that has use in compositions containing non-heterocyclic amines with pKa values greater than 9.5 to about 12.

SUMMARY OF THE INVENTION

The present invention relates to the discovery of the use of certain cyclic diamines in combination with certain portions of substituted phenolic compounds and non-heterocyclic amines with pKa values greater than 9.5 to about 12 as a suitable replacement for AEP.

Therefore, one aspect of the present invention is directed to a curable composition including (a) at least one cyclic diamine, (b) at least one non-heterocyclic amine that has a pKa value of from about 9.5 to about 12 at 25° C. for the most basic amine group in the non-heterocyclic amine molecule, (c) at least one epoxy resin, and (d) at least one alkylated phenol; (i) wherein the equivalents of the amine hydrogens from the cyclic diamine compared to the total amine hydrogens from both the cyclic diamine and the non-heterocyclic amine in the composition are greater than about 5 percent (%); (ii) wherein the ratio of the equivalents of the total amine hydrogens in the composition to the equivalents of the total epoxies in the composition is greater than or equal to about 1; and (iii) wherein the alkylated phenol is in an amount greater than about 10 weight percent (wt %) of the curable composition.

Another aspect of the present invention is directed to a process of preparing a curable composition including admixing: (a) at least one cyclic diamine, (b) at least one non-heterocyclic amine that has a pKa value of from about 9.5 to about 12 at 25° C. for the most basic amine group in the non-heterocyclic amine molecule, (c) at least one epoxy resin, (d) at least one alkylated phenol, and (e) at least one catalyst to form the curable composition.

Still another aspect of the present invention is directed to a thermoset product comprising a product obtained from the polymerization of the above described composition.

DETAILED DESCRIPTION OF THE INVENTION

In its broadest scope, the present invention is a curable composition including (a) at least one cyclic diamine, (b) at least one non-heterocyclic amine that has a pKa value of approximately 9.5 to about 12 at 25° C. for the most basic amine group in the non-heterocyclic amine molecule, (c) at least one epoxy resin, and (d) at least one alkylated phenol; (i) wherein the equivalents of the amine hydrogens from the cyclic diamine compared to the total amine hydrogens from both the cyclic diamine and the non-heterocyclic amine are greater than about 5%; (ii) wherein the ratio of the equivalents of the total amine hydrogens in the composition to the equivalents of the total epoxies in the composition is greater than or equal to about 1; and (iii) wherein the alkylated phenol is in an amount greater than about 10 wt % of the curable composition.

Below the minimum amounts specified in (i)-(iii) above, the reactivity will be less than what would be desirable using AEP. The upper limit for (i)-(iii) above will be dictated by the desired property performance of the resulting cured composition rather than reactivity alone. The upper concentration limits of the composition of the present invention may be determined experimentally for a specific application by one skilled in the art.

In general, the cyclic diamine used in the present invention may be illustrated by the following general structure of Formula (I):

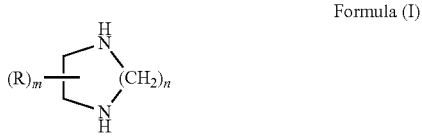

Formula (I)

wherein n is an integer from 1 to 3; m is an integer from 1 to 4; and R may be H, CH3, CH2CH3.

Various embodiments of the cyclic diamine useful in the present invention may be illustrated by the following chemical formulas (II) to (IV):

Formula (II)

Formula (III)

Formula (IV)

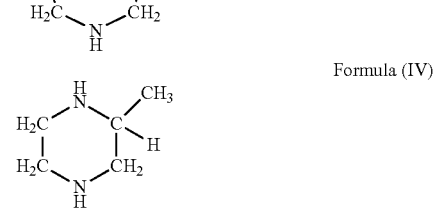

wherein Formula (II) is piperazine when the substituents of the cyclic diamine of Formula (I) are as follows: n=2, m=1 and R=H; wherein Formula (III) is homopiperazine when the substituents of the cyclic diamine of Formula (I) are as follows: n=3, m=1 and R=H; and Formula (IV) is 2-methyl piperazine when the substituents of the cyclic diamine of Formula (I) are as follows: n=2, m=1 and R=CH$^3$.

The compositions of the present invention may be used to replace N-aminoethylpiperazine (AEP) while still maintaining the fast reactivity that the AEP typically imparts to compositions.

While the present invention is directed to a non-AEP formulation i.e. a formulation containing no AEP, in one embodiment, it would be possible to replace a portion of the cyclic amine of the present invention with a predetermined low level amount of AEP to produce an AEP-containing formulation containing a low level concentration of AEP. In this embodiment, by a low level concentration it is meant for example, a concentration of less than 25 wt %. A practical aspect of the formation of this low AEP-containing formulation is to allow one skilled in the art to reduce the dependence on AEP while reducing the cost of using AEP in a formulation.

In order to maximize reactivity in a formulation, in one embodiment of the present invention, the cyclic diamine, component (a), is combined with a non-heterocyclic amine, component (b), wherein the non-heterocyclic amine has a pKa value of from about 9.5 to about 12 at 25° C. for the most basic amine group in the non-heterocyclic amine molecule. Generally, the non-heterocyclic amines have a pKa value from about 9.5 to about 12, preferably a pKa value from about 9.5 to about 11.3, and more preferably a pKa value from about 9.5 to about 10.8.

A non-heterocyclic amine, component (b) of the present invention, is an organic compound that does not contain a ring structure where one of the carbon atoms has been replaced by a nitrogen atom. For example, piperidine is a six-membered ring which contains five carbon atoms and one nitrogen atom in the ring. In contrast for example, isophorone diamine contains a six-membered ring but all the ring atoms are carbons. One of the nitrogens in isophorone diamine is attached to a carbon in the ring but does not replace a carbon in the ring. Likewise, for example, diethylenetriamine is a non-cyclic amine because it contains no ring structure.

Examples of the types of non-heterocyclic amines useful in the present invention, may be selected based on data generated by SciFinder using Advanced Chemistry Development (ACD/Labs) Software V8.14 for Solaris (© 1994-2009 ACD/Labs) are as follows: One group of amine curing agents may include primary and secondary polyamines. For example, polyfunctional amines may include aliphatic amine compounds such as diethylenetriamine (pKa 10.05±0.10 at 25° C.; D.E.H. 20, available from The Dow Chemical Company); triethylenetetramine (pKa 10.05±0.19 at 25° C.; D.E.H. 24, available from The Dow Chemical Company); tetraethylenepentamine (pKa 10.07±0.19 at 25° C.; D.E.H. 26, available from The Dow Chemical Company); and mixtures thereof.

Additional types of non-heterocyclic amines useful in the present invention, may include for example cycloaliphatic amines such as 3,3'-dimethyl-4,4'-diaminodicyclohexylmethane (pKa 11.02±0.70 at 25° C.); 4,4'-diaminodicyclohexylmethane (pKa 10.87±0.70 at 25° C.); isophoronediamine (10.74±0.70 at 25° C.); and other similar products; and mixtures thereof.

Another group of amine curing agents used as the non-heterocyclic amines in the present invention may include for example adducts formed by the reaction of epoxy resins with an excess of the above mentioned amines. For example, D.E.H. 52 (available from The Dow Chemical Company) is the adduct of a bisphenol A diglycidyl ether with an excess of D.E.H. 20. In another example, Ancamine T available from Air Products is an adduct of ethylene oxide with an excess of diethylenetriamine. Another example, includes Ancamine 1769 which is an adduct of propylene oxide with an excess of triethyenetetramine. The above adducts meet the pKa property of the present invention because the excess diethylenetriamine and tetraethylenetetramine meet the pKa property. An alkanolamine such as aminoethylethanolamine (pKa 9.61±0.10 at 25° C.) may be used in the present invention so long as at it meets the pKa property of the present invention composition. Mixtures of any of the above non-heterocyclic amines may also be used.

As a comparative illustration, some examples of non-heterocyclic amines which fall outside the scope of the present invention may include for example oxyalkylene polyamines such as triethyleneglycol diamine (pKa 9.04±0.10 at 25° C.); tetraethyleneglycol diamine (pKa 9.04±0.40 at 25° C.); and members of the polyoxyalkylene polyamine family such as Jeffamine D-230. Some alkanolamines such as monoethanolamine (pKa 9.16±0.10 at 25° C.) also fall outside the scope of the present invention. In addition, some aromatic amines such as methylenedianiline, which has a pKa of 5.32±0.25 at 25° C., fall outside the scope of the present invention.

The amounts of the cyclic diamine and the non-heterocyclic amine useful in the present invention are such that the equivalents of the amine hydrogens from the cyclic diamine compared to the total amine hydrogens from both the cyclic diamine and the non-heterocyclic amine in the composition are greater than about 5%, preferably from about 5% to about 75%, and more preferably from about 5% to about 50%.

The curable resin composition of the present invention includes at least one epoxy resin, component (a). Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric.

Any of the epoxy resins well known in the art can be used in the present invention provided the resins contain the properties desired by the composition of the present invention. For example, bisphenol A based epoxy resins sold under the trademark D.E.R.™ 300 series commercially available from The Dow Chemical Company may be used.

Preferably, the epoxy resin is diglycidyl ether of bisphenol A and derivatives, diglycidyl ether of bisphenol F and derivatives, or the epoxides containing two or more 1,2-epoxide radicals. Suitable epoxy resins include flame retardant epoxy resins based on tetrabromobisphenol A.

Preferably the epoxy resin component is a polyepoxide. Polyepoxide as used herein refers to a compound or mixture of compounds containing more than one epoxy moiety. Polyepoxide as used herein includes partially advanced epoxy resins that is, the reaction of a polyepoxide and a chain extender, wherein the reaction product has, on average, more than one unreacted epoxide unit per molecule. Aliphatic polyepoxides may be prepared from the known reaction of epihalohydrins and alcohols and may include such products as $C_{12}$-$C_{14}$ monoglycidyl ether (e.g., Heloxy Modifier 8 available from Hexion), 1,4-butanediol diglycidyl ether (e.g., Erisys GE-21 available from CVC Specialty Chemicals), trimethylolpropane triglycidylether (e.g., Erisys GE-30 available from CVC Specialty Chemicals), D.E.R. 732 (available from The Dow Chemical Company) and D.E.R. 736 (available from The Dow Chemical Company). These compounds are typically referred to as epoxy-functional reactive diluents or epoxy-functional flexibilizers.

Preferable compounds which can be employed herein include, epoxy resins such as, for example, the glycidyl ethers of polyhydric phenols, that is, compounds having an average of more than one aromatic hydroxyl group per molecule such as, for example, dihydroxy phenols, biphenols, bisphenols, halogenated biphenols, halogenated bisphenols, alkylated biphenols alkylated bisphenols, trisphenols, phenol-aldehyde novolac resins, substituted phenolaldehyde novolac resins, phenol-hydrocarbon resins, substituted phenol-hydrocarbon resins and any combination thereof.

The epoxy resin compounds other than the halogen-containing epoxy resin utilized in the composition of the present invention may be, for example, an epoxy resin or a combination of epoxy resins prepared from an epihalohydrin and a phenol or a phenol type compound. For example, the epoxy resin may be prepared (i) from an epihalohydrin and an amine (e.g., HJ EPIOL DA 802; an aniline diepoxide available from Hajin Chemtech Company); (ii) from an epihalohydrin and a carboxylic acid (e.g., Cardura E10 available from Hexion or Glydexx N10 available from Exxon both of which are epoxidized neodecanoic acid; Epiol ES602 available from Hajin which is diglycidyl-1,2-cyclohexane dicarboxylate; and others); or from the oxidation of unsaturated compounds such as epoxidized soybean oil (e.g., Vikoflex 7170 available from Arkema) or alpha-olefins (e.g., Vikolox 10 available from Arkema).

In one embodiment, the epoxy resins utilized in the compositions of the present invention include those resins produced from an epihalohydrin and a phenol or a phenol type compound. The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (i.e. the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

In another embodiment, the epoxy resins utilized in the compositions of the invention preferably include those resins produced from an epihalohydrin and bisphenols, halogenated bisphenols, hydrogenated bisphenols, novolac resins, and polyalkylene glycols, or combinations thereof. Examples of bisphenol A based epoxy resins useful in the present invention include commercially available resins such as D.E.R.™ 300 series and D.E.R.™ 600 series, commercially available from The Dow Chemical Company. Examples of epoxy Novolac resins useful in the present invention include commercially available resins such as D.E.N.™ 400 series, commercially available from The Dow Chemical Company.

In another embodiment, the epoxy resin compounds utilized in the compositions of the invention preferably include those resins produced from an epihalohydrin and resorcinol, catechol, hydroquinone, biphenol, bisphenol A, bisphenol AP (1,1-bis(4-hydroxyphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins, tetramethylbiphenol, tetramethyl-tetrabromobiphenol, tetramethyltribromobiphenol, tetrachlorobisphenol A, or combinations thereof. Preferably, the epoxy resin composition of the present invention contains diglycidyl ether of tetrabromobisphenol A.

The preparation of such compounds is well known in the art. See Kirk-Othmer, Encyclopedia of Chemical Technology, 3rd Ed., Vol. 9, pp 267-289. Examples of epoxy resins and their precursors suitable for use in the compositions of the invention are also described, for example, in U.S. Pat. Nos. 5,137,990 and 6,451,898; which are incorporated herein by reference.

In another embodiment, the epoxy resins utilized in the compositions of the present invention include those resins produced from an epihalohydrin and an amine. Suitable amines include diaminodiphenylmethane, aminophenol, xylene diamine, anilines, and the like, or combinations thereof.

In another embodiment, the epoxy resins utilized in the compositions of the present invention include those resins produced from an epihalohydrin and a carboxylic acid. Suitable carboxylic acids include phthalic acid, isophthalic acid, terephthalic acid, tetrahydro- and/or hexahydrophthalic acid, endomethylenetetrahydrophthalic acid, isophthalic acid, methylhexahydrophthalic acid, and the like or combinations thereof.

In another embodiment the epoxy resin refers to an advanced epoxy resin which is the reaction product of one or more epoxy resins components, as described above, with one or more phenol type compounds and/or one or more compounds having an average of more than one aliphatic hydroxyl group per molecule as described above. Alternatively, the epoxy resin may be reacted with a carboxyl substituted hydrocarbon, which is described herein as a compound having a hydrocarbon backbone, preferably a C1-C40 hydrocarbon backbone, and one or more carboxyl moieties, preferably more than one, and most preferably two. The C1-C40 hydrocarbon backbone may be a straight- or branched-chain alkane or alkene, optionally containing oxygen. Fatty acids and fatty acid dimers are among the useful carboxylic acid substituted hydrocarbons. Included in the fatty acids are caproic acid, caprylic acid, capric acid, octanoic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

The epoxy resin, component (c), of the present invention may be selected from, for example, oligomeric and polymeric diglycidyl ether of bisphenol A, oligomeric and polymeric diglycidyl ether of tetrabromobisphenol A, oligomeric and polymeric diglycidyl ether of bisphenol A and tetrabromobisphenol A, epoxidized phenol Novolac, epoxidized bisphenol A Novolac, oxazolidone-modified epoxy resins and mixtures thereof.

In another embodiment, the epoxy resin is the reaction product of a polyepoxide and a compound containing more than one isocyanate moiety or a polyisocyanate. Preferably, the epoxy resin produced in such a reaction is an epoxy-terminated polyoxazolidone.

The concentration of the components of the composition of the present invention are preferably based on the parts per hundred parts (phr) relative to the epoxy (100 phr).

The amount of epoxy resin useful in the present invention is such that the ratio of the equivalents of the total amine hydrogens in the composition to the equivalents of the total epoxies in the composition is greater than or equal to about 1, preferably a ratio of from about 1 to about 2, and more preferably a ratio of from about 1 to about 1.5.

Typical alkylated phenols, component (d), useful in the present invention include for example cresol, p-tert-butylphenol, p-octylphenol, p-nonylphenol, dodecylphenol, octadecylphenol, styrenated phenol, decylphenol, undecylphenol, tetradecylphenol, hexadecylphenol, isomers of these compounds as well as mixtures and the like such as the corresponding fused ring phenols called naphthols. The phenols may be mono-, di- and tri-alkylated substituted phenols. Preferably, the alkylated phenols useful in the present invention may be the monoalkylated phenols. Most preferably, the alkylated phenols may be nonylphenol (commercially available from the SI Group) and monostryenated phenol such as MSP-75 (commercially available from the SI Group) which are both liquids at room temperature.

The amount of alkylated phenol useful in the present invention is generally greater than about 10 wt % of the curable composition, preferably from about 10 wt % to about 65 wt % and more preferably from about 10 wt % to about 55 wt %.

In some embodiments of the present invention, in particular where a further increase in reactivity is desired, optional catalysts/accelerators may be used in the present invention composition. For example, catalysts/accelerators may include arenesulfonates such as methy p-toluenesulfonate as disclosed in German Patent No. DE 1770045; salicylic acid as disclosed in U.S. Pat. Nos. 3,740,373 and 7,414,097; methanesulfonic acid as disclosed in U.S. Pat. No. 3,785,997 and U.S. Pat. No. 4,894,431; triphenyl phosphite as disclosed in U.S. Pat. No. 4,683,281; DMP30 as disclosed in European Patent EP 767189; methylamine adducts of polyglycidyl ethers such as neopentyl glycol diglycidyl ether as disclosed in European Patent EP 783010; trimethylopropane triacrylate as disclosed in U.S. Pat. No. 4,835,241; calcium nitrate as disclosed in U.S. Pat. Nos. 5,243,014 and 5,198,146; 2,4,6-tris(dimethylaminomethyl)phenol (such as Ancamine K54 commercially available from Air Products); benzyldimethylamine and other well known catalysts/accelerators in the industry which are those knowledgeable in the art of catalyzing epoxy-amine reactions. All of the above references disclosing catalysts/accelerators are hereby incorporated by reference.

The curable resin composition according to the present invention may also contain additives such as other curing agents; other resins; fillers such as talc, polyethylene fibers; mineral aggregates such as sand, gravel, crushed stone, slag and recycled concrete; dyes; pigments; thixotropic agents; surfactants; fluidity control agents; stabilizers; diluents that aid processing; adhesion promoters; flexibilizers; toughening agents; fire retardants and the like; and mixtures thereof.

In one embodiment of the present invention, the curable resin composition of the present invention may be produced by mixing a "Side A", which generally includes the epoxy resin side and which may contain some of the substituted phenolic compound If desired, with a "Side B" which generally includes the amine side. In general, it is important that when both sides are mixed the constraints that were mentioned above are met. There is nothing critical about the order of mixing Side A with Side B. In some embodiments for producing the composition, depending on the end use application of the composition, a preference may be in the design of the volumes of Side A and Side B such that certain predetermined volumes of each side are mixed.

For example, as an illustration of one embodiment of the present invention, the composition may be used in a marker adhesive end use. In a marker adhesive application, equal volumes of Side A and Side B may be used, and the following procedure may be followed:

The surface of a metal casting to be bonded is cleaned free of any deposit or loose materials, grease and other unwanted contaminants. The substrate, pavement, is grooved using a dual blade water cooled saw to provide approximately 1.25 inch (3.2 cm) deep grooves. The grooves in the pavement are cleaned, loose dust and water removed by use of an air pressure hose 80-120 psi (552 kPa-828 kPa). A resin component (Side A) and a hardener component (Side B) are heated to between about 90° F. (32.2° C.) to about 110° F. (43.3° C.) to aid flow through a positive displacement mixing and dispensing unit. Equal volumes of the resin component and the hardener component are mixed through a static mixer; a streak free color of the mixed material indicates good mixing. The mixed material, for example approximately 1.0 pint (473.2 mL) is dispensed into the groove by using appropriate spouts. The metal casting is placed in the adhesive and adhesive allowed to harden. The adhesive composition is judged to be ready for traffic after, for example, approximately one hour at substrate temperature of about 80° F. (26.7° C.).

For other end use applications, depending on the particular end use, there may be a preference to use twice the volume of Side A versus Side B or other predetermined amounts for each side. The volume used for Side A and Side B in a particular end use and the how the components are mixed together is not critical, so long as the constraints mentioned herein are followed. On the other hand, the proportions in which Side A and Side B are mixed and the particular components used in each composition such as for the preparation of the Side B composition may be important depending on the end use.

The present invention provides a resin composition, such as an epoxy composition, that will provide rapid gelation and curability in various applications such as civil engineering applications, and more specifically for example marker adhesives, pavement markings and bridge deckings. The present invention provides an alternative to fast curing epoxy formulations based on the use of N-aminoethylpiperazine (AEP).

EXAMPLES

The following examples and comparative examples further illustrate the present invention in detail but are not to be construed to limit the scope thereof.

The following general process was used in the Examples:
General Process for Producing the Curable Resin Composition and Reactivity Test Procedure An epoxy resin is designated as Side A. An amine-based accelerator mixture, designated as Side B, is prepared by mixing an amine(s) and a nonylphenol together until homogeneous.

The amounts of Side A and Side B needed to obtain the desired reaction stoichiometry are added into a plastic container (approximately 25-30 grams total) based on the proportions given in the Tables (Note: Side A is added to the container first).

The resulting blend is rapidly mixed in the container using a metal spatula for approximately 30 seconds to obtain a homogeneous mixture. Next, 20 grams (±0.5%) of the blend is weighed into a tared aluminum pan. Holding a hand held infrared thermometer 3-6 inches from the surface of the reaction mixture, the temperature of the mixture is measured and recorded about every 1-2 minutes. During this time, a small round wooden stick is lightly poked into the mixture to ascertain the point of gelation ("gelation" equals the time when the stick will not penetrate the surface of the reaction mixture). The gel time is recorded to the nearest 0.5 minute along with the peak exotherm temperature.

Examples 1-9 and Comparative Examples A and B

Comparative Example A (Control)

This Comparative Example A shows the reactivity of a formulation containing AEP and p-nonyl phenol. The composition and results of the example are shown in Tables I and II respectively.

TABLE I

| COMPOSITION | COMPONENT | WEIGHT (PBW) | EQUIVALENTS |
|---|---|---|---|
| Side A | | | |
| Epoxy resin | D.E.R. 331 | 100.00 | 0.5353 |
| Side B | | | |
| Amine Curing Agent(s) | AEP | 25.10 | 0.5837 |
| Alkylated phenol | p-nonyl phenol | 50.03 | |

TABLE II

| RESULTS | |
|---|---|
| Equivalent Ratio of Amine to Epoxy | 1.09 |
| % Equivalents of Cyclic Diamine in Total Amount of Amine Curing Agent | NA |
| Wt % alkylated phenol in binder system | 28.6 |
| Gel Time [minutes; 20 g Sample] | 9:00 |
| Peak Exotherm [° C. @ time (minutes)] | 139 @ 10:00 |

Comparative Example B

This Comparative Example B shows the reactivity of a system that is missing the presence of a cyclic diamine. The reactivity of Comparative Example B is significantly less than for Comparative Example A. The composition and results of the example are shown in Tables III and IV respectively.

TABLE III

| COMPOSITION | COMPONENT | WEIGHT (PBW) | EQUIVA-LENTS |
|---|---|---|---|
| Side A | | | |
| Epoxy resin | D.E.R. 331 | 100.00 | 0.5353 |
| Side B | | | |
| Amine Curing Agent(s) | aminoethylethanolamine | 18.59 | 0.5837 |
| Alkylated phenol | p-nonyl phenol | 56.54 | |

TABLE IV

| RESULTS | |
|---|---|
| Equivalent ratio of Amine to Epoxy | 1.09 |
| % Equivalents of Cyclic Diamine in Total Amount of Amine Curing Agent | NA |
| Wt % alkylated phenol in binder system | 32.3 |
| Gel Time [minutes; 20 g Sample] | 21:30 |
| Peak Exotherm [° C. @ time (minutes)] | 112 @ 23:00 |

Example 1

This formulation of Example 1 comprises a non-AEP accelerated system and surprisingly has a similar reactivity when compared to an AEP formulation (Comparative Example A). The composition and results of the example are shown in Tables V and VI respectively.

TABLE V

| COMPOSITION | COMPONENT | WEIGHT (PBW) | EQUIVALENTS |
|---|---|---|---|
| Side A | | | |
| Epoxy resin | D.E.R. 331 | 100.00 | 0.5353 |
| Side B | | | |
| Amine Curing Agent(s) | aminoethylethanolamine piperazine | 15.03 6.54 | 0.5850 |
| Alkylated phenol | p-nonyl phenol | 53.57 | |

TABLE VI

| RESULTS | |
|---|---|
| Equivalent ratio of Amine to Epoxy | 1.09 |
| % Equivalents of Cyclic Diamine in Total Amount of Amine Curing Agent | 26 |
| Wt % alkylated phenol in binder system | 30.6 |
| Gel Time [minutes; 20 g Sample] | 9:30 |
| Peak Exotherm [° C. @ time (minutes)] | 133 @ 9:30 |

Example 2

This formulation of Example 2 comprises a non-AEP accelerated system and surprisingly has greater reactivity when compared to an AEP formulation (Comparative Example A). The composition and results of the example are shown in Tables VII and VIII respectively.

TABLE VII

| COMPOSITION | COMPONENT | WEIGHT (PBW) | EQUIVALENTS |
|---|---|---|---|
| Side A | | | |
| Epoxy resin | D.E.R. 331 | 100.00 | 0.5353 |
| Side B | | | |
| Amine Curing Agent(s) | AEEA Piperazine | 11.19 11.27 | 0.5844 |
| Alkylated phenol | p-nonyl phenol | 52.69 | |

TABLE VIII

| RESULTS | |
|---|---|
| Equivalent ratio of Amine to Epoxy | 1.09 |
| % Equivalents of Cyclic Diamine in Total Amount of Amine Curing Agent | 45 |
| Wt % alkylated phenol in binder system | 30.1 |
| Gel Time [minutes; 20 g Sample] | 7:00 |
| Peak Exotherm [° C. @ time (minutes)] | 143 @ 7:00 |

Example 3

This formulation of Example 3 comprises a non-AEP accelerated system and surprisingly has the same reactivity when compared to an AEP formulation (Comparative Example A). This Example 3 illustrates what happens when aminoethylethanolamine is replaced with diethylenetriamine (DETA). The composition and results of the example are shown in Tables IX and X respectively.

TABLE IX

| COMPOSITION | COMPONENT | WEIGHT (PBW) | EQUIVALENTS |
|---|---|---|---|
| Side A | | | |
| Epoxy resin | D.E.R. 331 | 100.00 | 0.5353 |
| Side B | | | |
| Amine Curing Agent(s) | DETA Piperazine | 9.09 6.54 | 0.5927 |
| Alkylated phenol | p-nonyl phenol | 59.50 | |

TABLE X

| RESULTS | |
|---|---|
| Equivalent ratio of Amine to Epoxy | 1.11 |
| % Equivalents of Cyclic Diamine in Total Amount of Amine Curing Agent | 26 |
| Wt % alkylated phenol in binder system | 34.0 |
| Gel Time [minutes; 20 g Sample] | 9:00 |
| Peak Exotherm [° C. @ time (minutes)] | 139 @ 9:30 |

Example 4

This formulation of Example 4 comprises a non-AEP accelerated system and surprisingly has greater reactivity when compared to an AEP formulation (Comparative Example A). This Example 4 shows what happens when piperazine is replaced with homopiperazine. The composition and results of the example are shown in Tables XI and XII respectively.

TABLE XI

| COMPOSITION | COMPONENT | WEIGHT (PBW) | EQUIVALENTS |
|---|---|---|---|
| Side A | | | |
| Epoxy resin | D.E.R. 331 | 100.00 | 0.5353 |
| Side B | | | |
| Amine Curing Agent(s) | DETA Homopiperazine | 9.09 7.59 | 0.5922 |
| Alkylated phenol | p-nonyl phenol | 58.45 | |

TABLE XII

| RESULTS | |
|---|---|
| Equivalent ratio of Amine to Epoxy | 1.11 |
| % Equivalents of Cyclic Diamine in Total Amount of Amine Curing Agent | 30 |
| Wt % alkylated phenol in binder system | 33.4 |
| Gel Time [minutes; 20 g Sample] | 8:00 |
| Peak Exotherm [° C. @ time (minutes)] | 135 @ 8:30 |

What is claimed is:

1. A curable composition comprising (a) at least one cyclic diamine, wherein the at least one cyclic diamine comprises piperazine, homo-piperazine or mixtures thereof; (b) at least one non-heterocyclic amine that has a pKa value of 10.74 to about 12 at 25° C. for the most basic amine group in the non-heterocyclic amine molecule, (c) at least one epoxy resin, and (d) at least one alkylated phenol; (i) wherein the equivalents of the amine hydrogens from the piperazine, homo-piperazine or mixtures thereof compared to the total amine hydrogens from both the piperazine, homo-piperazine or mixtures thereof and the non-heterocyclic amine in the composition are greater than about 45%; (ii) wherein the ratio of the equivalents of the total amine hydrogens in the composition to the equivalents of the total epoxies in the composition is greater than or equal to about 1; (iii) wherein the alkylated phenol is in an amount greater than about 10 wt % of the curable composition; and (iv) wherein the curable composition has a reactivity equal to or greater than a reactivity of the curable composition above where (a) and (b) are substituted with N-aminoethylpiperazine (AEP) and satisfying the conditions (ii) and (iii).

2. The composition of claim 1, wherein the at least one non-heterocyclic amine comprises 3,3'-dimethyl-4,4'-diamino-dicyclohexylmethane, 4,4'-diaminodicyclohexylmethane, isophoronediamine or mixtures thereof.

3. The composition of claim 1, wherein the ratio of the equivalents of the total amine hydrogens in the composition to the equivalents of the total epoxies in the composition is from about 1 to about 2.

4. The composition of claim 1, wherein the at least one epoxy resin comprises diglycidyl ether of bisphenol A, diglycidyl ether of bisphenol F or mixtures thereof.

5. The composition of claim 1, wherein the at least one alkylated phenol comprises nonylphenol, monostyrenated phenol, pentadecylphenol or mixtures thereof.

6. The composition of claim 1, wherein the concentration of the at least one alkylated phenol comprises from about 10 weight percent to about 65 weight percent.

7. The composition of claim 1, including at least one catalyst.

8. The composition of claim 1, including at least one filler comprising talc, polyethylene fibers or mixtures thereof.

9. The composition of claim 1, including at least one aggregate comprising sand, gravel, crushed stone, slag, recycled concrete or mixtures thereof.

10. A thermoset product comprising a product obtained from the polymerization of the composition of claim 1.

11. A process for preparing a curable composition comprising admixing (a) at least one cyclic diamine, wherein the at least one cyclic diamine comprises piperazine, homo-piperazine or mixtures thereof; (b) at least one non-heterocyclic amine that has a pKa value of 10.74 to about 12 at 25° C. for the most basic amine group in the non-heterocyclic amine molecule, (c) at least one epoxy resin, and (d) at least one alkylated phenol; (i) wherein the equivalents of the amine hydrogens from the piperazine, homo-piperazine or mixtures thereof compared to the total amine hydrogens from both the piperazine, homo-piperazine or mixtures thereof and the non-heterocyclic amine in the composition are greater than about 45%; (ii) wherein the ratio of the equivalents of the total amine hydrogens in the composition to the equivalents of the total epoxies in the composition is greater than or equal to about 1; and (iii) wherein the alkylated phenol is in an amount greater than about 10 wt % of the curable composition; and (iv) wherein the curable composition has a reactivity equal to or greater than a reactivity of the curable composition above where (a) and (b) are substituted with N-aminoethylpiperazine (AEP) and satisfying the conditions (ii) and (iii).

12. A curable composition comprising (a) at least one cyclic diamine, wherein the at least one cyclic diamine comprises piperazine, homo-piperazine or mixtures thereof; (b) at least one non-heterocyclic amine that has a pKa value of 9.5 to about 12 at 25° C. for the most basic amine group in the non-heterocyclic amine molecule, (c) at least one epoxy resin, and (d) at least one alkylated phenol; (i) wherein the equivalents of the amine hydrogens from the piperazine, homo-piperazine or mixtures thereof compared to the total amine hydrogens from both the piperazine, homo-piperazine or mixtures thereof and the non-heterocyclic amine in the composition are greater than about 45%; (ii) wherein the ratio of the equivalents of the total amine hydrogens in the composition to the equivalents of the total epoxies in the composition is greater than or equal to about 1; (iii) wherein the alkylated phenol is in an amount greater than about 10 wt % of the curable composition; and (iv) wherein the curable composition has a reactivity equal to or greater than a reactivity of the curable composition above where (a) and (b) are substituted with N-aminoethylpiperazine (AEP) and satisfying the conditions (ii) and (iii).

* * * * *